United States Patent Office 3,460,966
Patented Aug. 12, 1969

3,460,966
METHOD OF IMPROVING THE RECEPTIVITY FOR ADHESIVELY APPLIED COATINGS OF ALUMINUM SURFACES HAVING RESIDUAL ROLLING OILS THEREON
Ehrlich M. Eiland, Lower Burrell, Pa., assignor to Aluminum Company of America, Pittsburgh, Pa., a corporation of Pennsylvania
No Drawing. Filed Apr. 6, 1965, Ser. No. 446,074
Int. Cl. B44d 1/34
U.S. Cl. 117—49
1 Claim

ABSTRACT OF THE DISCLOSURE

An article having an aluminum surface with residual rolling oil thereon may have the receptivity of that surface for adhesively applied coatings improved by treating said aluminum surface with a solution consisting essentially of alcohol, ammonia and water, in which on the order of 0.1 to 1 percent by weight of micron sized silicia is suspended, whereby the adhesion preventing characteristics of said oil are counteracted.

---

This invention relates to treatment of aluminum surfaces, and more particularly to improving the receptivity of aluminum surfaces to various coatings. Aluminum, as generally used herein, embraces both aluminum of various commercial grades and aluminum base alloys.

The commercial applications of aluminum sheet and foil have been continually increasing, and there is a growing market for aluminum, for example, in labeling and packaging. Consequently, it has become necessary to economically render aluminum surfaces, particularly in as-rolled tempers, receptive to adhesion of conventional oleaginous and organic-solvent type printing inks, adhesives, lacquers, plastic films and other adhesively applied coatings.

Copious amounts of oil are commonly employed in the rolling of aluminum sheet and foil, for example, and the aluminum surfaces retain substantial amounts of residual rolling lubricant on and in the natural films of oxide present on such surfaces. Such surfaces, especially in as-rolled condition, exhibit poor water wettability. Many commonly used printing inks, wash coats and adhesives, for example, exhibit little or no adhesion to an oily aluminum surface and may be easily stripped or lifted from the surface. In fact, by far the most objectionable characteristics of as-rolled surfaces preventing adhesion of coatings, are attributed to the presence of residual rolling oil. Consequently, it is generally necessary to remove residual rolling oil from the aluminum surface or to counteract the same chemically. It is important, for most applications, that such treatment does not adversely affect the surface appearance of the metal, particularly its brightness and image clarity.

It is a general object of this invention to provide a method for improving the coating receptivity of aluminum surfaces having residual rolling oil thereon.

It is a more specific object of this invention to provide a method of treating aluminum surfaces having residual rolling oil thereon and thereby improve the receptivity of such surfaces to various adhesively applied coatings, including plastic films, adhesives, inks, lacquers or other protective or decorative matter.

Other objects and advantages of the invention will become evident in the following description thereof.

According to the present invention, an article having an aluminum surface with residual rolling oil thereon is treated with a solution consisting essentially of alcohol, ammonia and water in which a small amount of micron sized silica is suspended. It has been found that this treatment of an aluminum surface imparts to the surface the property of being wetted by various coatings, and is particularly useful for the treatment of oil bearing, as-rolled aluminum foil and sheet in strip form. The treatment improves the receptivity of the aluminum surface to adhesion of various coatings, which coatings include non-aqueous oleaginous and organic-solvent type printing inks, adhesives, dewaxed shellac, nitrocellulose and vinyl lacquers, plastic films, and other similar protective or decorative matter.

The solution used in accordance with the invention contains alcohol, desirably as the primary component, and preferably in an amount consisting at least 50 percent by weight of the solution. The alcohol content may be supplied as ethanol, methanol, n-propanol, or the like. The solution must also contain ammonia ($NH_3$), desirably about 0.5 to 12 percent by weight, and water desirably about 1 to 35 percent by weight. Except for the suspended silica content described more fully below, the solution may consist essentially of these three components, but it may also contain other components as hereinafter referred to.

In the alcohol-ammonia-water solution as described, there is suspended a small amount on the order of 0.1 to 1 percent by weight of micron sized silica. In such silica the particles have an average particle diameter on the order of 1 to 10 microns. A particularly suitable micron sized silica is Davison's Syloid 308 silica, which has an average particle size of 7 microns.

The solution may be employed at room temperature, but is usually more effective at a somewhat elevated temperature of about 90 to 120° F. Higher temperatures may be used but are unnecessary; they generally accenuate the inevitable loss by evaporation of some ammonia. The alkalinity of the solution is best maintained by using an ammonia content providing a pH of about 10 to 11.

Without other components than those above-named, the solution is very effective for improving the adhesion to the aluminum surface of joining type adhesives, and also in improving the adhesion of laminate films, lacquers and inks. The solution may also advantageously contain a hydrocarbon solvent such as toluene, suitably in an amount up to about 20 percent by weight. Further, especially in cases where it is desirable to prepare the surface for an adhesive, lacquer or ink which is compatible with shellac, it has been found advantageous for the solution to contain a small amount of shellac, preferably in an amount up to about 2 percent by weight.

The aluminum surface to be treated may have the solution described above applied thereto by any suitable means, such as by wiping or spraying, or the aluminum may be simply immersed in the solution. Particularly good results have been obtained on aluminum strip by rapidly running the strip through a pan of solution, at speeds up to 500 feet per minute, for example. A contact time of only a fraction of a second has proven adequate. Surplus solution may be wiped off, or squeezed off by rolls, and the treated surface may be force dried at elevated temperatures, if desired. However, for direct application of adhesive coatings, drying is not necessary.

The initially oily aluminum surface, treated in accordance with the invention, is highly receptive to such conventional non-aqueous oleaginous and organic-solvent type printing inks as rotogravure, flexographic and lithographic inks, as well as to emulsion type adhesives, plastic films, and to nitrocellulose, dewaxed shellac and vinyl wash coatings. In fact, the treated aluminum retains good receptivity to a variety of such coatings even after several weeks of storage. Good water resistance is obtained with coatings which are themselves suited to water exposure, whereas many other surface treatments for oily aluminum do not produce this result.

As an example (Ex. 1) of the practice of the invention, as rolled .004" thick 1145–H19 aluminum foil, with residual rolling oil on its surface, was treated as follows. The foil, in strip form, was run at 100 feet per minute through a solution held in a pan about three feet long. The solution was held at a temperature of 94° F. and contained approximately, by weight, 56.8 percent n-propanol, 11.9 percent ammonia ($NH_3$), 30.5 percent water and 0.6 percent Syloid 308 silica in suspension. The strip leaving the bath was run through a pair of squeegee rolls to remove excess solution, and was force dried to permit dry rewinding. Samples of the foil so treated exhibited acceptable water wettability for ink and adhesive coating applications. Coatings applied exhibited good coating adhesion and scuff resistance.

In the following table, several examples of compositions of solutions that may be used in accordance with the invention (including the solution just referred to above) are set forth:

TABLE

| Component | Percent by weight | | | |
|---|---|---|---|---|
| | Ex. 1 | Ex. 2 | Ex. 3 | Ex. 4 |
| Alcohol: | | | | |
| n-Propanol | 56.8 | 50.6 | 55.8 | 88.0 |
| Ethanol | | | 1.2 | 0.7 |
| Ammonia ($NH_3$) | 11.9 | 6.2 | 12.1 | 1.0 |
| Water | 30.5 | 15.1 | 29.5 | 3.1 |
| Silica Syloid 308 | 0.6 | 0.8 | 0.8 | 0.9 |
| Toluene | | 27.3 | | 6.0 |
| Shellac | | | 0.6 | 0.3 |

These solutions may be used to treat aluminum surfaces having residual rolling oil thereon, particularly surfaces of as-rolled aluminum sheet and foil. Such thin aluminum products as foil in thicknesses of .001 and well below 0.001 inch in thickness may be so treated without difficulty. Various alloys, such as 1145, 3003, 5052, in H–19 and other as-rolled tempers, may be so treated to great advantage.

The treatment of aluminum surfaces bearing rolling oil as described should have advantageous use in preparing packaging materials, for example, where it is necessary to print or otherwise decorate an aluminum surface. Such treatment will not dull or stain the metal surface so that a package, carton, or wrapper made from as-rolled strip which has been treated accordingly for ink receptivity will have an attractive bright surface exhibiting good image clarity. Aluminum which has been surface treated in accordance with my invention may be used for other purposes than labeling and packaging, since many other uses for coating-receptive aluminum surfaces will, of course, be obvious to those skilled in the art.

Having thus described my invention, I claim:

1. A method for improving the receptivity, for adhesively applied coatings, of aluminum sheet and foil in an as-rolled temper having a bright aluminum surface with residual rolling oil thereon and exhibiting poor water wettability, which comprises treating said aluminum surface with a solution having a pH of about 10 to 11 and consisting essentially of at least 50 percent by weight alcohol, about 0.5 to 12 percent ammonia and about 1 to 35 percent water, in which on the order of 0.1 to 1 percent by weight of micron sized silica is suspended, whereby the adhesion preventing characteristics of said oil are counteracted and the bright treated aluminum surface is rendered water wettable without dulling or staining thereof.

References Cited

UNITED STATES PATENTS

| 327,426 | 9/1885 | Young | 252—154 |
| 1,428,084 | 9/1922 | Gravell | 117—49 |
| 2,976,170 | 3/1961 | Eiland | 117—49 |
| 3,037,886 | 6/1962 | Ryznar | 117—49 X |
| 3,166,444 | 1/1965 | Ehren et al. | |
| 3,301,674 | 1/1967 | Uhlig | 117—49 X |

FOREIGN PATENTS

| 20,442 | 7/1905 | Great Britain. |
| 340,323 | 12/1930 | Great Britain. |
| 341,974 | 1/1931 | Great Britain. |
| 657,349 | 9/1951 | Great Britain. |

RALPH S. KENDALL, Primary Examiner

J. R. BATTEN, Jr., Assistant Examiner

U.S. Cl. X.R.

134—4, 40; 252—154, 159